United States Patent
Subramanian

(10) Patent No.: US 6,871,210 B1
(45) Date of Patent: Mar. 22, 2005

(54) AUTOMATIC ALLOCATION OF LEAST LOADED BOOT SERVER TO PXE CLIENT ON A NETWORK VIA DHCP SERVER

(75) Inventor: Hemang Chamakuzhi Subramanian, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 686 days.

(21) Appl. No.: 09/655,093

(22) Filed: Sep. 5, 2000

(51) Int. Cl.[7] .............................................. G06F 15/16
(52) U.S. Cl. ....................... 709/203; 709/104; 709/105; 709/200; 709/203; 709/219; 709/226; 709/229
(58) Field of Search ................................ 709/105, 253, 709/217–219, 223, 201–203, 220, 221, 222, 224–229, 246

(56) References Cited

U.S. PATENT DOCUMENTS

| | | | | |
|---|---|---|---|---|
| 5,862,348 A | * | 1/1999 | Pedersen | 709/105 |
| 5,872,968 A | * | 2/1999 | Knox et al. | 713/2 |
| 6,078,960 A | * | 6/2000 | Ballard | 709/203 |
| 6,189,102 B1 | * | 2/2001 | Beser | 713/201 |
| 6,233,616 B1 | * | 5/2001 | Reid | 709/225 |
| 6,263,368 B1 | * | 7/2001 | Martin | 709/224 |
| 6,330,617 B1 | * | 12/2001 | Bamforth et al. | 709/246 |
| 6,351,775 B1 | * | 2/2002 | Yu | 709/238 |
| 6,393,458 B1 | * | 5/2002 | Gigliotti et al. | 709/203 |
| 6,438,598 B1 | * | 8/2002 | Pedersen | 709/227 |
| 6,473,802 B2 | * | 10/2002 | Masters | 718/105 |
| 6,490,677 B1 | * | 12/2002 | Aguilar et al. | 713/1 |
| 6,574,229 B1 | * | 6/2003 | Takahashi et al. | 370/400 |
| 6,598,159 B1 | * | 7/2003 | McAlister et al. | 713/2 |
| 6,601,096 B1 | * | 7/2003 | Lassiter, Jr. | 709/222 |
| 6,725,253 B1 | * | 4/2004 | Okano et al. | 709/203 |
| 6,751,646 B1 | * | 6/2004 | Chow et al. | 709/105 |
| 6,754,706 B1 | * | 6/2004 | Swildens et al. | 709/219 |

* cited by examiner

*Primary Examiner*—Ario Etienne
*Assistant Examiner*—Ramy Osman
(74) *Attorney, Agent, or Firm*—Anthony VS England; T. Rao Coca

(57) ABSTRACT

This invention relates to a method, system and the computer readable program product wherein the least loaded boot server is prioritized for service by a single DHCP/PXE server by maintaining a boot server allocation table (SAT) containing the existing client load count for each boot server, maintaining a client allocation table (CAT) associating each client IP address with the corresponding boot server IP address, prioritizing the boot servers by sorting said SAT in order of increasing load count whenever it is updated and providing the IP address of the boot servers in the sequence of their listing in said SAT for access whenever a client requests the DHCP.

11 Claims, 2 Drawing Sheets

AUTOMATIC ALLOCATION OF LEAST LOADED BOOT SERVER TO PXE CLIENT ON A NETWORK VIA DHCP SERVER

FIELD OF THE INVENTION

This invention relates to an automatic allocation of least loaded boot server to PXE client on a network via DHCP server.

BACKGROUND OF THE INVENTION

A Network Computing Scenario is one in which there are one or more boot servers with many network computers on the same network. These network computers load their operating systems with boot images present on these boot servers. These network computers depend on the Dynamic Host Configuration Protocol (DHCP) server which gives them their Internet Protocol (IP) addresses along with certain other parameters like the boot file server address, etc. which US enable them to boot up from the network.

Basic functionality of the DHCP/PXE proxy server is explained in FIG. 1 of the accompanying drawings wherein a network computing environment with two Pre Boot Execution Environment (PXE) clients and two boot servers and one DHCP/PXE proxy server has been shown. The working of the DHCP/PXE server is as follows:

1. When a PXE client seeks boot service from the network, it sends a DHCP discover packet to part (67) containing the PXE client extension tags
2. The DHCP server sends an extended DHCP offer packet to port (68) containing PXE server extension tags and other DHCP options tags including the client EP address
3. The PXE client then sends a request for installation to DHCP server port (67) containing PXE clients extension tags along with other DHCP option tags
4. The DHCP server sends the DHCP ACKnowledge reply to port (68)
5. The PXE client sends a boot server discover packet on the network to port (67) or (4011) of the allocated boot server containing the PXE client extension tags
6. The allocated boot server sends a boot server ACKnowledge reply on the network to the client source port containing PXE server extension tags
7. The PXE client sends a request for download of the network boot strap program to Trivial File Transfer Protocol (TFTP) port (69) of Multi Cast File Transfer Protocol (MTFTP) port.
8. The boot server downloads the network boot strap program (boot image) to the client port.

It may thus be seen that in this network, when a PXE client requests for IP address from DHCP server, it receives a DHCP offer packet, which contains the lists of the types and IP addresses of boot servers available on the network. The DHCP offer packet format is as follows:

| Field Length | Value | Comment |
| --- | --- | --- |
| Op(1) | 2 | Code for BOOT REPLY |
| Htype(1) | * | |
| Hlen(1) | * | |
| Hops(1) | * | |
| Xid(4) | * | |
| Secs(2) | * | |

-continued

| Field Length | Value | Comment |
| --- | --- | --- |
| Flags(2) | * | |
| Ciaddr(4) | 0.0.0.0 | Server Always sets this value to Zero |
| Yiaddr(4) | a0,a1,a2,a3 | Client's IP Address provided by the server |
| Siaddr(4) | a0,a1,a2,a3 | Next BootStrap Server IP address |
| Giaddr(4) | * | |
| Chaddr(16) | * | Client's MAC address |
| Sname(64) | * | Can be overloaded using option 66 |
| Bootfile(128) | * | can be overloaded using option 67 |
| 99.130.83.99 DHCP OPTIONS | | |

| Tag Name | Tag Number | Length | Data Field |
| --- | --- | --- | --- |
| DHCP Message Type | 53 | 1 | 2 = DHCPOFFER |
| SERVER IDENTIFIER | 54 | 4 | A1,a2,a3,a4 |
| Client Machine Identifier | 97 | 17 | TYPE(1) UUID (16) 0 = UUID |
| Class Identifier | 60 | 9 | "PXEClient" |
| Vendor Options | 43 | Varies | Encapsulated options |
| PXE DISCOVERY CONTROL | 6 | 1 | |
| DISCOVERY_MC AST_ADDRESS | 7 | 4 | Multicast IP address |
| PXE BOOT SERVERS | 8 | Varies | Boot Server type(2), Ipcnt(2), IP-addr-list(IPCnt * 4), Boot Server type(2),... |
| PXE BOOT MENU | 9 | Varies | Boot Server type(2), desclen(1),"description", Boot server type(2)... |
| PXE MENU PROMPT | 10 | Varies | Timeout(1), prompt |

The PXE BOOT SERVERS tag contains the list of boot server addresses for each type of boot server and is made available to the PXE client.

The PXE client user via manual intervention i.e. by pressing the <F8> key after boot up would be able to select from the various types of boot servers that would be present on the network. The type of the boot server is indicated by the boot server type (2) field of the option.

However, this intervention by the user results in the selection of the boot server, which appears first in the list of DHCP offer packet. This normally results in overloading of the allocated boot server resulting in slow response to the PXE client.

THE OBJECTS AND SUMMARY OF THE INVENTION

The object of this invention is to obviate the above drawback by providing automatic allocation of least loaded boot server to PXE client on a network via DHCP/PXE proxy server.

To achieve said objective, this invention provides in a computing system it comprising of plurality of clients and boot servers of a particular type, and single DHCP/PXE server, a method in said DHCP/PXE server for allocating a boot server to each requesting client characterized in that the least loaded boot server is prioritized for service by:

maintaining a boot Server Allocation Table (SAT) containing the existing client load count for each boot server, maintaining a Client Allocation Table (CAT) associating each client IP address with the corresponding boot server IP address, prioritizing the boot servers by sorting said SAT in order of increasing load count whenever it is updated, and providing the IP addresses of the boot servers in the sequence of their listing in said SAT for access whenever a client requests the DHCP.

The said SAT is updated to increment a particular boot server load count whenever that boot server sends an acknowledge (ACK) to a requesting client.

The said CAT is updated to include an entry associating the client with a particular boot server IP address whenever a boot server sends an acknowledge ACK to the client.

The said CAT is updated to remove an entry corresponding to a particular client whenever the DHCP refreshes it's IP addresses pool and discovers that said client is not available.

The said SAT is updated to decrement the load count on a particular boot server using the association between the client and server given in the CAT whenever the DHCP refreshes it's IP addresses pool and discovers that said client is not available.

The boot Server Allocation Table (SAT) contains the boot server IP address and the count of the number of times the server is used for booting up on the network.

In a computing system comprising of plurality of clients and boot servers of a particular type, and single DHCP/PXE server, a method in said DHCP/PXE server for allocating a boot server to each requesting client characterized in that the least loaded boot server is prioritized for service by:

i) initialization of the DHCP server to obtain a boot server IP address (BSIP), Server Allocation table (SAT) and Client Allocation Table (CAT);

ii) incrementing the load count on SAT and updating CAT with the entry of a new client and IP address when DHCP server receives an ACK packet from a boot server servicing a client;

iii) updating CAT and comparing it with the previous image of CAT (CATP) to identify changes in CAT, if no ACK packet is received, decrementing the load count on SAT of the boot server and replacing the previous image of CAT (CATP) with current image of CAT to help in identifying changes in the network status in the next cycle;

iv) establishing priority of allocation of boot servers by sorting load count on SAT in an increasing order;

v) extracting prioritized IP address list of boot servers from SAT and posting to DHCP option, PXE boot server tag; and vi) repeating the cycle from step (ii) onwards again and again.

In a computing system comprising of plurality of clients and boot servers of a particular type, and single DHCP/PXE server, a system in said DHCP/PXE server for allocating a boot server to each requesting client characterized in that the least loaded boot server is prioritized for service by:

a boot Server Allocation Table (SAT) means containing the existing client load count for each boot server, a Client Allocation Table (CAT) means for associating each client IP address with the corresponding boot server IP address, means for prioritizing the boot servers by sorting said SAT means in order of increasing load count whenever it is updated, and means for providing the IP addresses of the boot servers in the sequence of their listing in said SAT means for access whenever a client requests the DHCP.

The said SAT means is updated to increment a particular boot server load count whenever that boot server sends an acknowledge (ACK) to a requesting client.

The said CAT means is updated to include an entry associating the client with a particular boot server IP address whenever a boot server sends an acknowledge ACK to the client.

The said CAT means is updated to remove an entry corresponding to a particular client whenever the DHCP refreshes it's IP addresses pool and discovers that said client is not available.

The said SAT means is updated to decrement the load count on a particular boot server using the association between the client and server given in the CAT whenever the DHCP refreshes it's IP addresses pool and discovers that said client is not available.

The boot Server Allocation Table (SAT) means contains the boot server IP address and the count of the number of times the server is used for booting up on the network.

A computer program product comprising a computer storage medium having computer readable code residing on a DHCP/PXE server for allocation of least loaded boot server to PXE client.

A computer readable program product further comprises computer readable code means configured to maintain a boot Server Allocation Table (SAT) containing the existing client load count for each boot server including updating said SAT to increment a particular boot server load count whenever that boot server sends an acknowledge (ACK) to a requesting client.

A computer readable program product further comprises computer readable code means configured to maintain a Client Allocation Table (CAT) associating each client IP address with the corresponding boot server IP address including updating said CAT to include an entry associating the client with a particular boot server IP address whenever a boot server sends an acknowledge (ACK) to the client.

The said computer readable code means also updates said CAT to remove an entry corresponding to a particular client whenever the DHCP refreshes its IP addresses pool and discovers that said client is not available.

A computer readable program product further comprises computer readable code means configured for providing the IP addresses of the boot servers in the sequence of their listing in said SAT for excess whenever a client requests the DHCP/PXE server.

A computer readable program product further comprises computer readable code means configured to prioritize the boot servers by sorting said SAT in order of increasing load count whenever it is updated including updating said SAT to decrement the load count on a particular boot server using the association between the client and server given in the CAT whenever the DHCP refreshes its IP addresses pool and discovers that said client is not available.

BRIEF DESCRIPTION OF THE DRAWINGS

The invention will now be described with reference to accompanying drawings and an example.

DETAILED DESCRIPTION OF THE DRAWINGS

Figure 1:
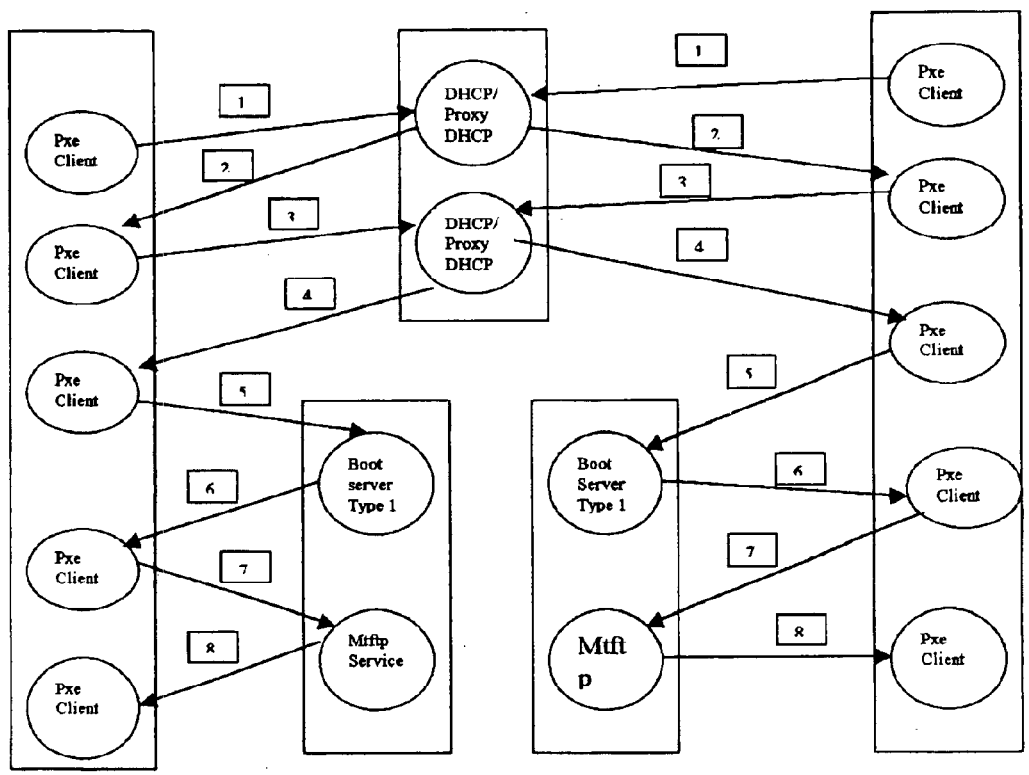
FIG. 1 shows a conventional network computing environment with two PXE clients and two boot servers.

FIG. 1 has already been explained under the heading background of the invention.

Figure 2:
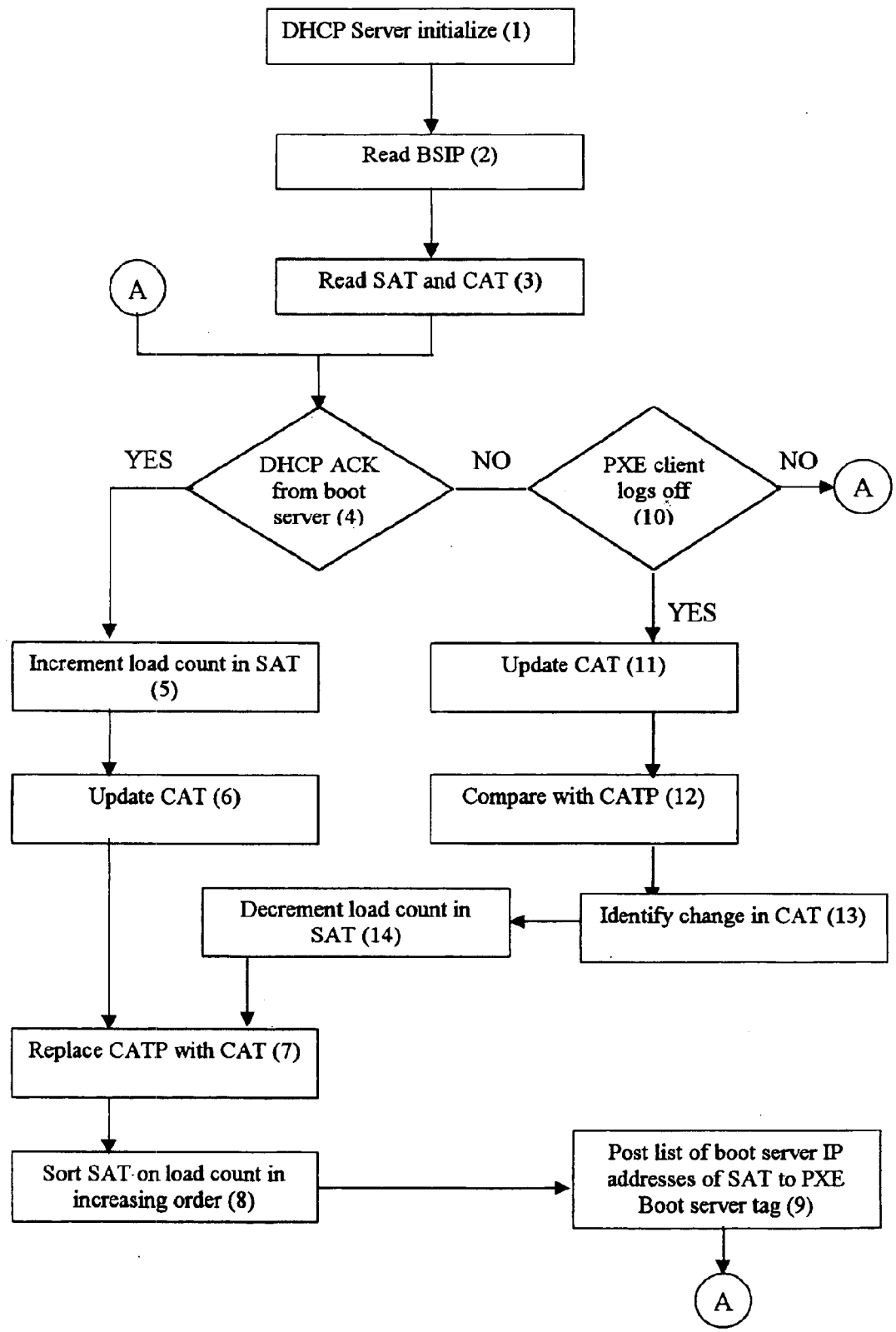
FIG. 2 shows prioritization of the least loaded boot severs, according to this invention.

The prioritization of the least loaded boot servers as illustrated in FIG. 2 is explained below.

When a DHCP server initializes, at box 1, it obtains the boot server IP address list (BSIP) at box no. (2), the Server Allocation Table (SAT) and Client Allocation Table (CAT) at box (3).

When the DHCP server receives ACK packet at box 4 from the boot server servicing a client, then it increments the load count in SAT at box (5). The CAT at box (6) is updated with entry of new client and IP address of the boot server servicing it.

In the event, no ACK packet is received at box (4) from any boot server, then the DHCP server checks for network message of a client being shut down or is not available at box (10).

If the above check is successful, then it updates the CAT at box (11). This CAT is compared with previous image of CAT (CATP) at box (12) to identify the changes in the CAT at box (13).

The load count of the boot server identified of being relieved of servicing a client is decremented in SAT at box (14).

The previous image of the CAT (CATP) is replaced by the current image of the CAT at box (7) for reference to help in identifying changes in the network status in the next cycle The SAT is sorted on load count in increasing order at box (8) to establish priority of allocation of boot servers The prioritized IP address list of the boot servers is extracted from SAT and is posted to the DHCP option, PXE boot server tag at box 9

The above process is repeated to check for the receipt of ACK message, as box (4) from boot server or when the check for a PXE client logs off is negative.

EXAMPLE

Consider a Network Computing Environment comprising of say 1 DHCP/PXE proxy server. 3 IBM WSOD (Work Space On Demand) Servers as Boot Servers for boot up and some 50 PXE Network Computers.

Each time a Network Computer comes up in the network it gets its IP address and list of Boot servers from the DHCP/PXE server.

Without application of this method, by default the only boot server available is of WSOD and all 50 of them Boot up from the Same IP address depending on how the DHCPOFFER packet frames the IP address list.

Using this method the DHCPOFFER packet would enable the equivalent distribution of load amongst the various boot servers of the same type on the network.

In this case two of the boot servers would have 17 Network Clients booting up from them and one of them would have 16 Network Computers booting from it.

This would be advantageous in situations when many boot servers come up at the same time and the TFTP/MTFTP server will have to service all of them at once. On application of this method the performance of the boot servers would increase substantially in a way that the load would be shared amongst the TFTP/MTFTP servers.

Thus the load is shared among the various boot servers.

In a Network Computing environment where there are a number of Boot Servers and DHCP/PXE proxy if the number of Clients a particular Boot Server supports is large a new Boot server can be added to the network and the DHCP/PXE server reinitialized. This would cause all new Network Computers to boot up from this new Boot Server till the count would be equal to the number of machines that booted up from the previously existing boot servers.

ADVANTAGES

The above method would reduce the load on the Boot servers while enabling the network PC's to boot up as per order. This provides an easy management of the network by sharing the load amongst the various computers and thus helps in improving the performance of a network.

REFERENCES

1. PreBoot Execution Environment (PXE Specification) Version 2.1, Sep. 20, 1999, Intel Corporation.
2. Dynamic Host Configuration Protocol, RFC 2131 DHCP Options and BOOTP Vendor Extensions, RFC 2132

We claim:

1. In a computing system comprising a plurality of clients and boot servers, and a DHCP/PXE server, a method in said DHCP/PXE server for allocating a boot server to a requesting client characterized in that a least loaded boot server is prioritized for service by:

maintaining a boot Server Allocation Table (SAT) containing a listing of boot servers and an existing client load count for each boot server, maintaining a Client Allocation Table (CAT) associating client IP addresses with corresponding boot server IP addresses, prioritizing the boot servers by sorting said listing in an ordered sequence of increasing load count whenever one of the load counts is updated, and providing the IP addresses of the boot servers in the sequence of their listing in said SAT for access whenever a client requests the DHCP/PXE server, wherein said SAT is updated to increment a particular boot server load count whenever that boot server sends an acknowledge (ACK) to a requesting client and wherein said CAT is updated to include an entry associating the requesting client with a particular boot server IP address whenever a boot server sends an ACK to the requesting client.

2. A method as claimed in claim 1 wherein said CAT is updated to remove an entry corresponding to a particular client whenever the DHCP/PXE server discovers that said client is not available.

3. In a computing system comprising a plurality of clients and boot servers, and a DHCP/PXE server, a method in said DHCP/PXE server for allocating a boot server to a requesting client characterized in that a least loaded boot server is prioritized for service by:

maintaining a boot Server Allocation Table (SAT) containing a listing of boot servers and an existing client load count for each boot server, maintaining, a Client Allocation Table (CAT) associating client IP addresses with corresponding boot server IP addresses, prioritizing the boot servers by sorting said listing in an ordered sequence of increasing load count whenever the load count is updated, and providing the IP addresses of the boot servers in the sequence of their listing in said SAT for access whenever a client requests the DHCP/PXE server, wherein said SAT is updated to increment a particular boot server load count whenever that boot server sends an acknowledge (ACK) to a requesting client and wherein said SAT is updated to decrement the load count for a particular boot server using the association between the client and server given in the CAT whenever the DHCP/PXE server discovers that said client is not available.

4. In a computing system a comprising a plurality of clients and boot servers, and a DHCP/PXE server, a method in said DHCP/PXE server for allocation a boot server to a requesting client characterized in that a least loaded boot server is prioritized for service by:
   maintaining a boot Server Allocation Table (SAT) containing a listing of boot servers and an existing client load count for each boot server,
   maintaining a Client Allocation Table (CAT) associating client IP addresses with corresponding boot server IP addresses,
   prioritizing the boot servers by sorting said listing in an ordered sequence of increasing load count whenever the load count is updated and
   providing the IP addresses of the boot servers in the sequence of their listing in said SAT for access whenever a client requests the DHCP/PXE server, wherein said SAT is undated to increment a particular boot server load count whenever that boot server sends an acknowledge (ACK) to a requesting client and wherein the boot Server Allocation Table (SAT) contains the boot server IP addresses and counts of times the boot servers are issued for booting up a client.

5. A computing system comprising a plurality of clients and boot servers and a DHCP/PXE server, a system in said DHCP/PXE server for allocating a boot server to a requesting client characterized in that a least loaded boot server is prioritized for service by:
   a boot Server Allocation Table (SAT) means containing a listing of boot servers and an existing client load count for each boot server,
   a Client Allocation Table (CAT) means for associating client IP addresses with corresponding boot server IP address,
   means for prioritizing the boot servers by sorting said listing in an ordered sequence of increasing load count whenever one of the load counts is updated, and
   means for providing the IP addresses of the boot servers in the sequence of their listing in said SAT means for access whenever a client requests the DHCP/PXE server: wherein said SAT means is updated to increment a particular boot server load count whenever that boot server sends an acknowledge (ACK) to a requesting client and wherein said CAT means is updated to include an entry associating the requesting client with a particular boot server IP address whenever a boot server sends an ACK to the requesting client.

6. A system as claimed in claim 5, wherein said CAT means is updated to remove an entry corresponding to a particular client whenever the DHCP/PXE server discovers that said client is not available.

7. A computing system comprising a plurality of clients and boot servers, and a DHCP/PXE server, a system in said DHCP/PXE server for allocating a boat server to a requesting client characterized in that a least loaded boot server is prioritized for service by:
   a boot Server Allocation Table (SAT) means containing a listing of boot servers ad an existing client load count for each boot server,
   a Client Allocation Table (CAT) means for associating client IP addresses with comprising boot server IP addresses,
   means for prioritizing the boot servers by sorting said listing in an ordered sequence of increasing load content whenever one of the load counts is updated, and
   means for providing the IP addresses of the boot servers in the sequence of their listing in said SAT means for access whenever a client requests the DHCP/PXE server, wherein said SAT means is updated to increment particular boot sever load count whenever th boot server sends acknowledge (ACK) to a requesting client and wherein said SAT means is updated to decrement the load count for a particular boot server using the association between the client and server given in the CAT whenever the DHCP/PXE server discovers that said client is not available.

8. A computing system comprising a plurality of clients and boot servers, and a DHCP/PXE server, a system in said DHCP/PXE server for allocating a boot server to a requesting client characterized in that a least loaded boot server is prioritized for service by:
   a boot Server Allocation Table (SAT) means containing a listing of boot servers and an existing client load count for each boot server,
   a Client Allocation Table (CAT) means for associating client IP addresses with corresponding boot server IP address,
   means for prioritizing the boot servers by sorting said lisp in an ordered sequence of increasing load count whenever one of the load counts is updated, and
   means for providing the IP addresses of the boot servers in the sequence of their listing in said SAT means for access whenever a client requests the DHCP/PXE server, wherein said SAT means is updated to increment a particular boot server load count whenever that boot server sends an acknowledge (ACK) to a requesting client and wherein the boot Server Allocation Table (SAT) means contains the boot server IP addresses and counts of times the servers are used for booting up a client.

9. A computer program product comprising a computer storage medium having computer readable code means, the computer readable code means comprising:
   a boot Server Allocation Table (SAT) means containing a listing of boot servers and an existing client load count for each boot server,
   a Client Allocation Table (CAT) means for associating client IP addresses with the corresponding boot server IP addresses
   means for prioritizing the boot servers by sorting said listing in an ordered sequence of increasing load count whenever one of the load counts is updated, and
   means for providing the IP addresses of the boot servers in the sequence of their listing in said SAT means for access whenever a client requests the DHCP/PXE server wherein said SAT means is updated to increment a particular boot server load count whenever that boot server sends an acknowledge (ACK) to a requesting client and wherein the CAT means is updated to include an associating the requesting client with a particular boot server IP address whenever a boot server sends an ACK to the client.

10. A computer readable program product as claimed in claim 9, wherein said computer readable code means also updates said CAT to remove an entry corresponding to a particular client whenever the DHCP/PXE server discovers that said client is not available.

11. A computer program product comprising a computer storage medium having computer readable code means, the computer readable code means comprising:

a boot Server Allocation Table (SAT) means containing a listing of boot servers and an existing client load count for each boot server, a Client Allocation Table (CAT) means for associating client IP addresses with corresponding boot serer IP addresses, means for prioritizing the boot servers by sorting said list in an ordered sequence of increasing load count whenever one of the load counts is updated, and means for providing the IP addresses of the boot servers in the sequence of their listing in said SAT means for access whenever a client requests the DHCP/PXE server, wherein said SAT means is updated to increment a particular boot server load count whenever that that boot server sends an acknowledge (ACK) to a requesting client and further comprising computer readable code means configured to prioritize the boot servers by sorting said listing in an ordered sequence of increasing load count whenever one of the load counts is updated including updating said SAT to decrement the load count for a particular boot server using the association between the requesting client and boot server given in the CAT whenever the DHCP/PXE server discovers that said client is not available.

* * * * *